US010483770B2

(12) United States Patent
Cun

(10) Patent No.: US 10,483,770 B2
(45) Date of Patent: Nov. 19, 2019

(54) VEHICLE CHARGING STATION HAVING DEGRADED ENERGY STORAGE UNITS AND METHODS THEREOF

(71) Applicant: Honda Motor Co., Ltd., Tokyo (JP)

(72) Inventor: David Wong Cun, Fountain Valley, CA (US)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 15/609,385

(22) Filed: May 31, 2017

(65) Prior Publication Data

US 2018/0345807 A1   Dec. 6, 2018

(51) Int. Cl.
*H02J 7/00* (2006.01)

(52) U.S. Cl.
CPC ..... *H02J 7/0021* (2013.01); *H02J 2007/0096* (2013.01)

(58) Field of Classification Search
USPC ......................................................... 320/109
See application file for complete search history.

(56) References Cited

U.S. PATENT DOCUMENTS

| | | | |
|---|---|---|---|
| 5,315,227 A | 5/1994 | Pierson et al. | |
| 5,548,200 A * | 8/1996 | Nor ....................... | B60L 11/184 320/106 |
| 8,710,791 B2 | 4/2014 | Gochenaur | |
| 9,153,847 B2 | 10/2015 | Harty | |
| 10,081,261 B2 * | 9/2018 | Grimes ............... | B60L 11/1816 |
| 2006/0152196 A1 * | 7/2006 | Matsumoto ........... | H02J 7/0029 320/132 |
| 2009/0027013 A1 * | 1/2009 | Odaohhara ........... | H02J 7/0068 320/160 |
| 2009/0187284 A1 * | 7/2009 | Kreiss ..................... | G06Q 50/06 700/291 |
| 2011/0115425 A1 | 5/2011 | Olsson | |
| 2012/0056588 A1 | 3/2012 | Cai et al. | |
| 2012/0074901 A1 * | 3/2012 | Mohammed ........ | B60L 11/1842 320/109 |
| 2012/0131367 A1 * | 5/2012 | Kamijima ............. | H02J 7/0021 713/323 |
| 2012/0309455 A1 * | 12/2012 | Klose .................. | B60L 11/1838 455/557 |
| 2013/0020993 A1 * | 1/2013 | Taddeo ................. | H02J 7/0027 320/109 |

(Continued)

FOREIGN PATENT DOCUMENTS

WO       2015103164 A1       7/2015

*Primary Examiner* — Samuel Berhanu
(74) *Attorney, Agent, or Firm* — Honda Patents & Technologies North America, LLC; Aaron C. Fong

(57) ABSTRACT

The systems and methods disclosed herein are directed to a vehicle charging station having at least one energy storage unit in a degraded state. The station may provide power using the energy storage unit to an electric or hybrid vehicle. In an illustrative embodiment, power from the station is provided to the vehicle from the energy storage unit, power grid or a combination thereof. Logic or processes for providing power to the energy storage unit for the charging station may depend on a variety of factors including, but not limited to, capacity of the energy storage units, number of units, information about an incoming vehicle to charge, etc. After charging, the energy storage unit in its degraded state may be used for fast charging the vehicle.

18 Claims, 17 Drawing Sheets

| | 402A | 402B | 402C | 402D |
|---|---|---|---|---|
| FILL TIME (HOUR) | ENERGY STORAGE UNIT 1 (MAX 35%) | ENERGY STORAGE UNIT 2 (MAX 40%) | ENERGY STORAGE UNIT 3 (MAX 20%) | ENERGY STORAGE UNIT 4 (MAX 85%) |
| 0.5 | 10% (9kW) | 10% (3.2kW) | 5% (1.1kW) | 10% (1.6kW) |
| 1.0 | 20% (18kW) | 23% (7.36kW) | 10% (2.2kW) | 25% (4kW) |
| 1.5 | 27% (24.3kW) | 31% (9.92kW) | 12% (2.64kW) | 35% (5.6kW) |
| 2.0 | 30% (27kW) | 36% (11.52kW) | 13% (2.86kW ) | 50% (8kW) |
| 2.5 | 30% (27kW) | 37% (11.84kW) | 14% (3.08kW) | 60% (9.6kW) |
| 3.0 | 31% (27.9kW) | 37% (11.84kW) | 14% (3.08kW) | 65% (10.4kW) |
| 3.5 | 32% (28.8kW) | 38% (12.16kW) | 15% (3.3kW) | 70% (11.2kW) |
| 4.0 | 32% (28.8kW) | 38% (12.16kW) | 16% (3.52kW) | 75% (12kW) |
| 4.5 | 33% (29.7kW) | 39% (12.48kW) | 17% (3.74kW) | 80% (12.8kW) |
| 5.0 | 34% (30.6kW) | 40% (12.8kW) | 18% (3.96kW) | 82% (13.12kW) |
| 5.5 | 34% (30.6kW) | 40% (12.8kW) | 19% (4.18kW) | 83% (13.3kW) |
| 6.0 | 35% (31.5kW) | 40% (12.8kW) | 20% (4.4kW ) | 85% (13.6kW) |

(56) References Cited

U.S. PATENT DOCUMENTS

| | | | |
|---|---|---|---|
| 2013/0113417 A1* | 5/2013 | Nakashima | H02J 7/0019 |
| | | | 320/107 |
| 2014/0132214 A1 | 5/2014 | Katanoda | |
| 2014/0316600 A1 | 10/2014 | Jammer | |
| 2014/0320084 A1 | 10/2014 | Masuda et al. | |
| 2015/0069970 A1* | 3/2015 | Sarkar | B60L 11/1816 |
| | | | 320/109 |
| 2015/0165915 A1* | 6/2015 | Cun | H02J 7/35 |
| | | | 320/101 |
| 2015/0253789 A1 | 9/2015 | Saussele et al. | |
| 2015/0328999 A1* | 11/2015 | Dureau | B60L 11/1842 |
| | | | 320/109 |
| 2015/0333565 A1 | 11/2015 | Korman | |
| 2015/0360578 A1* | 12/2015 | Duan | B60L 11/1861 |
| | | | 340/455 |
| 2016/0339788 A1 | 11/2016 | Miftakhov | |
| 2017/0138539 A1* | 5/2017 | Aoki | F17C 5/007 |

\* cited by examiner

VEHICLE CHARGING STATION HAVING DEGRADED ENERGY STORAGE UNITS AND METHODS THEREOF

BACKGROUND

Car manufacturers of electric and hybrid vehicles may incorporate energy storage units to reduce or eliminate carbon emissions by removing, partially or completely, internal combustion engines. Ranges for these vehicles may vary depending on the terrain and driving conditions before recharge. The amount of time required to fully charge the energy storage unit of an electric vehicle may range between 4 to 8 hours, while hybrid vehicles may complete charging within 2 to 6 hours. To overcome such long periods of time, companies have developed and manufactured fast charging stations. Typical charging times may be reduced to less than 30 minutes using these stations. Drawbacks of these systems, however, may include the use of a significant amount of power from a grid oftentimes when power is not readily available for fast charging.

Energy storage units for these vehicles may last for 8 to 10 years and/or 7000 charging cycles. After their capacity has fallen below a threshold, however, the units may no longer be usable for these vehicles. Nevertheless, these units may have remaining capacity for alternative uses including charging the vehicles themselves. These units may be placed into fast charging systems. The present disclosure provides a system and method thereof that addresses these concerns and in particular, using those degraded units within charging stations and charging the units to provide fast charging. Other benefits and advantages will become clear from the disclosure provided herein and those advantages provided are for illustration.

BRIEF DESCRIPTION

According to one exemplary embodiment, a computer-implemented method for a charging station to provide power to a vehicle energy storage is provided. The method may include determining power to be supplied by at least one energy storage unit on the charging station based on a degraded state of the at least one energy storage unit and power to be supplied by a power grid connected to the charging station. In addition, the method may include providing the power to the vehicle energy storage from the at least one energy storage unit, the power grid or a combination thereof.

According to another exemplary embodiment, a charging station is provided. The charging station may include at least one energy storage unit having a degraded capacity and a controller determining power to be supplied by the at least one energy storage unit based on the degraded capacity and power to be supplied by a power grid.

According to yet another exemplary embodiment, a charging station computing system is provided. The computing system may include at least one processor and a memory operatively coupled to the processor, the memory storing program instructions that when executed by the processor, causes the processor to perform processes. The processes may include providing power to at least one energy storage unit having a degraded state based on a predetermined table and providing power to a vehicle connected to the charging station with the power from the at least one energy storage unit and supplemented by a power grid.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

Generally described, the systems and methods disclosed herein are directed to a vehicle charging station having at least one energy storage unit in a degraded state. The station may provide power using the energy storage unit to an electric or hybrid vehicle. In an illustrative embodiment, power from the station is provided to the vehicle from the energy storage unit, power grid or a combination thereof. Logic or processes for providing power to the energy storage unit for the charging station may depend on a variety of factors including, but not limited to, capacity of the energy storage units, number of units, information about an incoming vehicle to charge, etc. After charging, the energy storage unit in its degraded state may be used for fast charging the vehicle.

Numerous other modifications or configurations to the system and method will become apparent from the description provided below. For example, different capacities of the energy storage units on the charging station may be determined and used when providing the fast charge to the vehicle. This charging station may provide a second life for vehicle energy storage units that would have otherwise been discarded. Other advantages will become apparent from the description provided below. While the description below almost entirely refers to an automobile, the vehicle, as described herein, may include other transportation systems and methods including a bike, scooter, skateboard, railcar, watercraft, forklift and/or bus.

Figure 1:
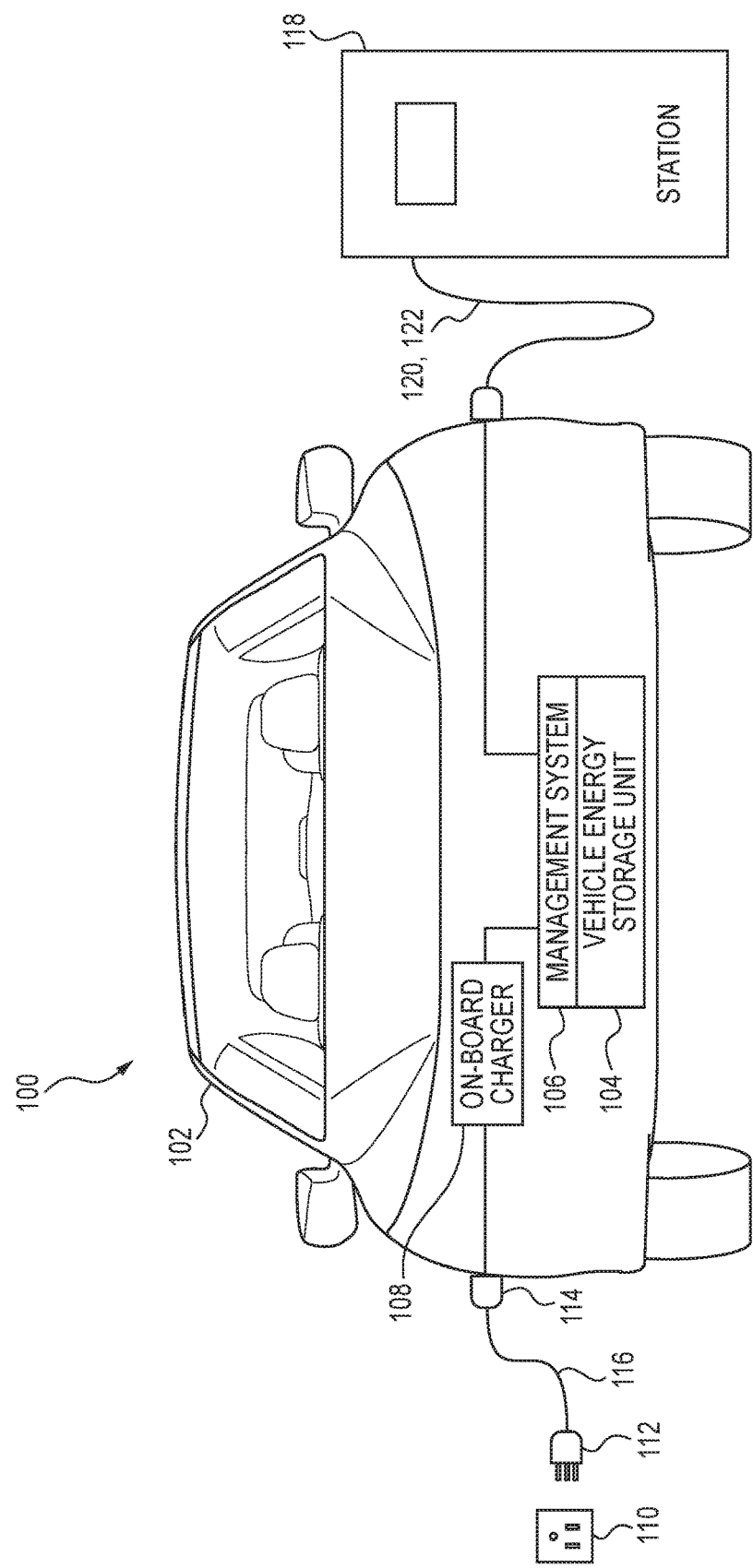
FIG. 1 is a schematic of an illustrative environment for charging a vehicle in accordance with one aspect of the present disclosure.

Turning to FIG. 1, a schematic of an illustrative environment 100 for providing power to a vehicle 102 in accordance with one aspect of the present disclosure is provided. The vehicle 102 may receive power through different mechanisms and methods, and are not limited to those described below. The vehicle 102 may include, but is not limited to, a vehicle energy storage unit 104, a management system 106, and/or an on-board charger 108. Fewer or more components may be part of the vehicle 102 and within the environment 100 itself.

The vehicle energy storage unit 104 may be referred to as a battery, but is not necessarily limited to such terminology. The storage unit 104 may use chemical energy stored in rechargeable packs. The storage unit 104 may be made of different materials. For example, lithium-manganese and a nickel, manganese, cobalt blend may be used. Nickel, cobalt and aluminum may be used. The type of materials that the vehicle energy storage unit 104 is made of may affect the weight and dimensions of the vehicle energy storage unit 104.

In hybrid vehicles 102, a lower amount of power may be used to charge an electric motor in combination with a combustion engine. For example, hybrid vehicles may include a 4.4 kWh battery or a 16 kWh battery. Electric vehicles 102, on the other hand, may use larger batteries. For example, the a 30 kWh battery or a 22 kWh battery may be used. Other electric vehicle manufacturers may include a 70-90 kWh battery.

The management system 106 of the vehicle 102 may be operatively coupled to the vehicle energy storage unit 104. Rechargeable energy storage systems may use a management system 106 to ensure safe and consistent operation over the life of the vehicle 102 and to report the status of the rechargeable energy storage systems to other vehicle control systems. The management system 106 monitors variations in capacity and impedance within the vehicle energy storage unit 104. Other functions of the management system 106 include protecting the storage unit 104 from operating outside its safe operating area, calculating secondary data, controlling its environment, authenticating it and or balancing the storage unit 104.

In one embodiment, the vehicle 102 may also include the on-board charger 108. The on-board charger 108 may convert alternating current to direct current (AC to DC). The charger 108 may be compatible with a power grid and designed to provide power to a vehicle energy storage unit 104. Both hybrid and electric vehicles 102 may include the charger 108. To provide power to the vehicle 102 through the on-board charger 108, the user may place a plug 112 into an outlet 110. A cord 116 coupled to the plug 112 may then be used to provide a connector 114 into the on-board charger 108. Power may flow from the outlet 110 to the on-board charger 108.

In one embodiment, and as will be described in more detail below, the vehicle 102 may be provided power through a vehicle charging station 118. The station 118 may include a station plug 120 and station cord 122, which may be connected into the hybrid or electric vehicle 102. The station 118 may provide an infrastructure that supplies power for the recharging of the vehicles 102. For purposes of this disclosure, the station 118 may use degraded energy storage units to provide charging including fast charge. These degraded units may also be referred to or include second use batteries. Degraded energy storage units may have a reduced maximum capacity. They may lose capacity over time due to internal conditions. Typically, a degraded condition is characterized by the units receiving more power than they output. A degraded energy storage unit may dissipate heat. Internally, heat may be created due to inefficiencies of the unit. Chemicals within the units may no longer be acting properly and thus, the units may become degraded. Further, the internal impedance of the units may increase as the unit becomes degraded.

Figure 2:
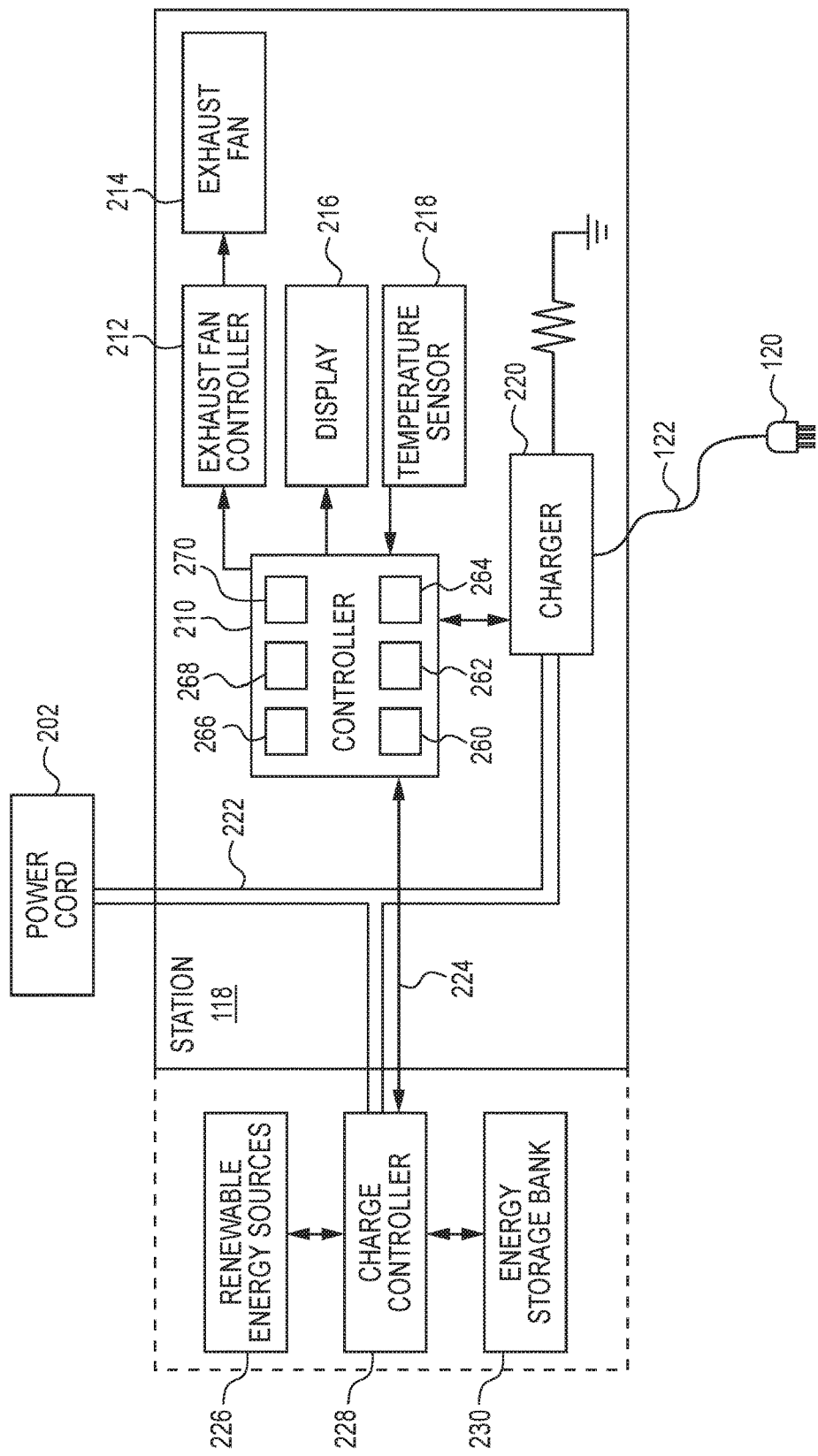
FIG. 2 is a schematic of an exemplary station having an energy storage bank for fast charging in accordance with one aspect of the present disclosure.

FIG. 2 is a schematic of an exemplary station 118 having an energy storage bank 230 for fast charging in accordance with one aspect of the present disclosure. The station 118 may include a controller 210. As will be shown, more than one controller may exist and be combined within the station 118 or in the alternative, a single controller may be used for the station 118. The controller 210 may include internal processing memory 260, an interface circuit 262, and bus lines 264 for transferring data, sending commands, and communicating with other components in the station 118. Generally, the controller 210 includes a processor 266 and memory 268. In some embodiments, the controller 210 also includes a communications device (not shown) for sending data internally in the station 118 and externally to connected devices. The communication device included within the controller 210 is capable of providing wired or wireless computer communications utilizing various protocols to send/receive electronic signals internally to its components. The controller 210 may communicate with the exhaust fan controller 212, exhaust fan 214, display 216, temperature sensor 218, and charger 220. Other components within the on-board and/or off-board power sources 204 may be also communicated with through those wired or wireless computer communications.

Computer programs may be typically stored in the memory 268 of the controller 210 until they are ready for execution, at which time the programs are brought into the memory unit 270 so that they may be directly accessed by the processor 266. The processor 266 may select a part of memory 268 to read and/or write by using an address that the processor 266 gives to the memory 268 along with a request to read and/or write. The reading and interpretation of an encoded instruction at an address causes the processor 266 to fetch a subsequent instruction, either at a subsequent address or some other address.

In one embodiment, the station 118 may include the exhaust fan controller 212, which may include similar components to those described for the controller 210 above. The exhaust fan controller 212 may be incorporated into the controller 210 of the station 118 or be itself a separate controller. The exhaust fan controller 212 may turn the exhaust fan 214 on and/or off based on a temperature within the station 118. Information from the temperature sensor 218 may be provided to the exhaust fan controller 212 to indicate the temperature of the station 118. If the temperature from the sensor 218 is above a predetermined threshold, then the exhaust fan controller 212 may signal to the exhaust fan 214 to turn on. When the station 118 has been cooled, then the exhaust fan 214 may shut off.

In one embodiment, the station 118 may include a display 216. The controller 210 may communicate information to the display 216 such that a user may operate the station 118, for example, implementing a charge sequence. Other information that may be provided on the display 216 may include, but is not limited to, predicted filling times, errors arising on the charging sequence and status of energy units within the station 118. Other features and items may be displayed that may be of interest to the operator of the station 118. In one embodiment, the display 216 may be a touch interface.

The station 118 also includes the charger 220. The controller 210 may be operatively connected to the charger 220 with the charger 220 plugged into a hybrid or electric vehicle 102. The charger 220 may be connected to the station cord 122 and station plug 120, as described earlier, for charging the vehicle 102. The controller 210 may turn the charger 220 on and/or off, which will be described in more details below. The controller 210 may also determine which power source the charger 220 uses to provide power to the hybrid or electric vehicle 102. The incoming power may be distributed through the power connector 222. The power may be received from a number of sources including, but not limited to, a power grid 202 and an energy storage bank 230. Logic or processes may be implemented within the controller 210 to make this determination. The controller 210 within the station 118 may use other parameters such as the degraded state of the energy storage bank 230 to determine which sources to use to charge the vehicle 102. Further details will be provided below.

As described above, the station 118 may be connected to the power grid 202. The grid 202 may include an interconnected network for delivering power from suppliers to consumers through the station 118. The power grid 202 may include generating stations and transmission lines that carry power from their source to the stations 118. Distribution lines may be connected to the individual stations 118. Other configurations may be implemented and used that define the power grid 202.

The power grid 202 may be used to provide power to the energy storage units within the energy storage bank 230 and/or to the vehicle 102. The vehicle 102 may be charged using power from the power grid 202 and the on-board and/or off-board power sources 204. The on-board and/or off-board power sources 204 may communicate with the controller 210 through the communication bus 224. The on-board and/or off-board power sources 204 may be connected with the station 118. The on-board and/or off-board power sources 204 may be located externally or internally to the station 118. In one embodiment, portions or parts of the on-board and/or off-board power sources 204 may be part of the station 118 and some portions may be located outside the station 118. By having the on-board and/or off-board power sources 204 located externally, the power sources may be remote from the station 118. Alternatively, the power sources may be connected directly allowing for easier access and less hardware to connect the station 118 to the on-board and/or off-board power sources 204.

Power may be drawn from both the power grid 202 and/or the on-board and/or off-board power sources 204 simultaneously. In one embodiment, one source may be used after another such that the power from the energy storage bank 230 may be used first and then power from the power grid 202. Alternatively, power from the power grid 202 may be used first and then the energy storage bank 230.

Different combinations of drawing power from the power grid 202 and the energy storage bank 230 may be implemented. Percentages of power may be drawn from the different sources, for example, 75% of power from the energy storage bank 230 while the remaining 25% of power may come from the power grid 202. Other sources may be included to provide power to charge the vehicle 102 including renewable energy sources 226.

A charge controller 228 may be part of the on-board and/or off-board power sources 204. Similar components for the controller 210 described above may be used for the charge controller 228. In one embodiment, the charge controller 228 may be responsible for communication with the controller 210 as well as communicating with the power sources associated with the on-board and/or off-board power sources 204 including but not limited to the renewable energy sources 226 and energy storage bank 230. The charge controller 228 may also be used to receive power from the renewable energy sources 226 and the energy storage bank 230 to provide power to the charger 220 through the power connector 222. Furthermore, power may be drawn from the power grid 202, by the charge controller 228, to charge the energy storage bank 230.

In one embodiment, the on-board and/or off-board power sources 204 may include the renewable energy sources 226. The renewable energy sources 226 may include, but not limited to, solar power, wind power sources, hydropower, geothermal power, wave power and biofuel power. The renewable energy sources 226 may be used to provide power to the energy storage units within the energy storage bank 230. In one embodiment, the renewable energy sources 226 may be used to provide power to the charger 220. The renewable energy sources 226 may provide power to the energy storage bank 230 as well as provide power to the charger 220 at the same time.

The charge controller 228 may communicate with the controller 210 within the station 118, and also may be part of the station 118 itself. Information may be communicated such as to whether to provide power to the energy bank storage 230. This power may come from the power grid 202 and/or the renewable energy sources 226. The controller 228 may then draw power from the energy storage bank 230 and the power grid 202 to supply power to the charger 220 and then in turn to the electric vehicle 102.

Figure 3:
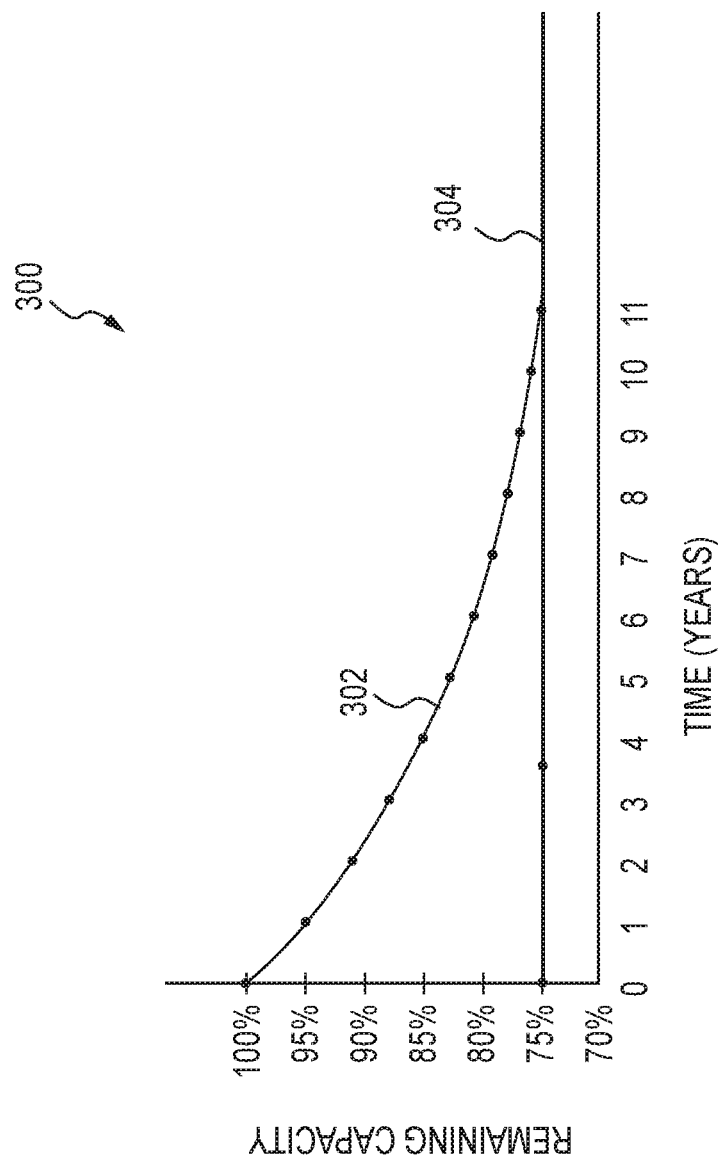
FIG. 3 is a schematic of an illustrative curve showing a remaining energy storage unit capacity over a period of time in accordance with one aspect of the present disclosure.

FIG. 3 is a schematic 300 of an illustrative curve 302 showing a remaining energy storage unit capacity over a period of time in accordance with one aspect of the present disclosure. The purpose of the curve 302 is to show the capacity of a typical energy storage unit over time in years and show a degraded energy storage unit. In one non-limiting example, voltage measurements may be taken to determine the capacity of the units.

The curve 302 may begin at a 100% capacity at year zero (0) and slowly trails to under 75% capacity around ten (10) years of usage by the electric or hybrid vehicle 102. Factors that may lead to a higher degradation of the energy storage unit before the ten (10) years may include the number of cycles the vehicle 102 has been charged and discharged. For example, if a user has a tendency to charge and discharge their vehicle 102 more often than "normal", then this may affect the time of years that the energy storage unit may be used. Colder climates may affect the capacity of the energy storage unit over time. Another factor that may lead to the quicker degradation of the capacity of an energy storage unit may include how quickly the user removes the capacity from the unit, for example, a user that drives aggressively may lose capacity over a period of time at a higher rate. These factors are not limiting. Increasing energy storage unit capacity may also occur based on these factors.

As shown in the schematic 300, an predetermined threshold 304 may be provided by some manufacturers that indicates whether the energy storage unit may no longer be usable by the electric or hybrid vehicle 102. In the shown example, the predetermined threshold 304 may be at 75%. The predetermined threshold 304 may vary from manufacturer to manufacturer. After the predetermined threshold 304 has been reached, the energy storage unit may no longer be viable for electric or hybrid vehicle use as determined by the manufacturer. At this point, the unit may be deemed "degraded". In one embodiment, the predetermined threshold 304 may vary dependent on whether the vehicle 102 is electric or hybrid. The hybrid vehicle 102 may require less capacity and may have a lower threshold than the energy storage unit for the electric vehicle 102. The purpose of the energy storage units in the energy storage bank 230 may be such that they may be re-used when they are no longer considered usable within the electric vehicles 102. These reusable units may be referred to as degraded.

Figure 4:
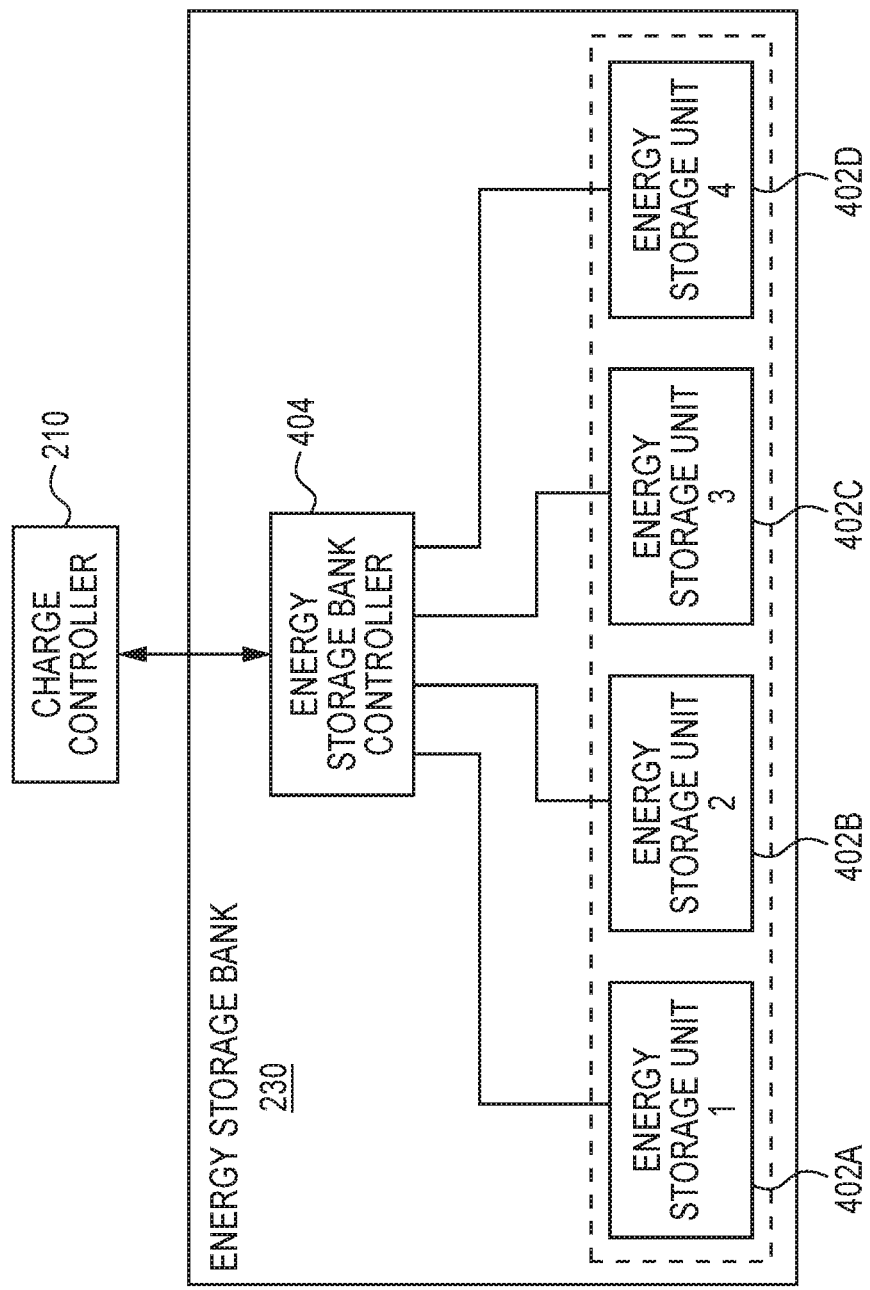
FIG. 4 is a schematic of an illustrative energy storage bank having multiple energy storage units in accordance with one aspect of the present disclosure.

Turning to FIG. 4, a schematic of an illustrative energy storage bank 230 having multiple energy storage units 402A, 402B, 402C and 402D (collectively units 402) in accordance with one aspect of the present disclosure is provided. While four energy storage units 402 have been shown, fewer or more units 402 may be provided. Each of the units 402 may receive power from the power grid 202 and/or the renewable sources 226 and further provide power to charge the electric or hybrid vehicle 102. Logic information within the energy storage bank controller 404 may be used to control the units 402. The controller 404 may also be used to determine the capacity of each unit 402A, 402B, 402C or 402D.

The energy storage bank controller 404 may communicate with the charge controller 210 of the station 118, which was described before. Power connections may be made such that the energy storage units 402 may be turned on and/or off to receive and release power. The energy storage bank controller 404 may include the same components as the controller 210 described above and may also be incorporated into the controller 210. While a number of controllers were described above, including the controller 210 for the station 118, the exhaust fan controller 212, the charge controller 228, and the energy storage bank controller 404, these may be combined into a single controller. Typically, the energy storage bank 230 may allow for easy access to the energy storage units 402.

Figure 5:
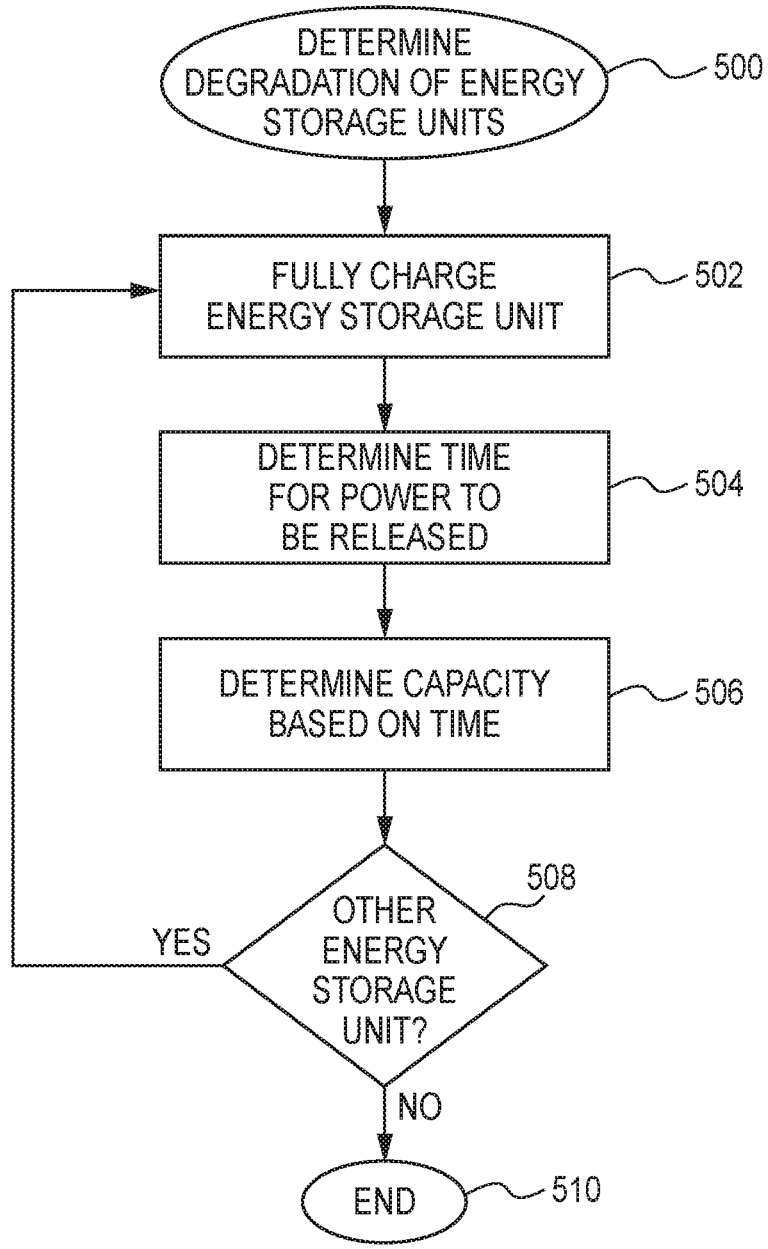
FIG. 5 is a schematic of an illustrative process flow diagram for determining a capacity of energy storage units in accordance with one aspect of the present disclosure.

The energy storage bank 230 may monitor each of the energy storage units 402 including determining the capacity levels of each of the units 402. FIG. 5 is a schematic of an illustrative process flow diagram for determining capacity of the energy storage units 402 in accordance with one aspect of the present disclosure. Other methods, processes and systems may be used to determine the capacity of the units 402. By detecting the capacity, fill times may be determined so that accurate predictions may be made on how much power the units 402 may store and if power from the grid 202 may be used to charge the vehicle 102. Fewer or more processes may be used and are not limited to those shown. The processes may begin at block 500 to determine capacity.

At block 502, and in accordance with this embodiment to determine capacity of a unit 402, an energy storage unit 402A, 402B, 402C or 402D may be fully charged. In one embodiment, power from the power grid 202 may be provided to the energy storage bank 230. The renewable energy sources 226 may be used. To determine whether the unit 402A, 402B, 402C or 402D has been fully charged, the energy storage bank controller 404 may check the terminals of the unit 402A, 402B, 402C or 402D. The terminals of the unit 402A, 402B, 402C or 402D may be checked by hard-wires monitored by the energy storage bank controller 404. A multimeter may be used. In one embodiment, and in no way limiting to the present disclosure, the voltage may be checked. If the voltage is within a predetermined threshold, the unit 402A, 402B, 402C or 402D may be considered full charged, for example, the unit 402A, 402B, 402C or 402D has a voltage between 13.7 to 14.7 Volts.

At block 504, a time to release the entire power from the unit 402A, 402B, 402C or 402D after having been fully charged is determined. At block 506, the capacity may be determined using the time it took for the unit 402A, 402B, 402C to 402D to have its power fully removed. In one example, the capacity may be determined by drawing one (1) Amp from the unit 402A, 402B, 402C or 402D and measuring the time it took to remove the power. Capacity may then be determined. The energy storage bank controller 404 may be used to draw out the one (1) Amp from the unit 402A, 402B, 402C or 402D as well as calculate the time it took to remove the power.

At determination block 508, a decision on whether other energy storage units 402A, 402B, 402C or 402D are present within the energy storage bank 230 is made. This decision may be made each time a new unit 402A, 402B, 402C or 402D is introduced or may be made periodically among all the units 402A, 402B, 402C or 402D. Other units 402A, 402B, 402C or 402D may have been checked already and there may not be any need to check the capacity again. The processes may end at block 510 if no other units 402A, 402B, 402C or 402D should be checked. Otherwise, processes may restart for the checking other units 402A, 402B, 402C or 402D at block 502.

As described above, the processes may be used to determine the capacity of the units 402. Determining fill times of the units 402 may then be calculated using the capacity, i.e., how long the units 402 are charged based on its degraded state. A table or chart for this information may then be compiled which will be shown in further details below.

Figure 6:
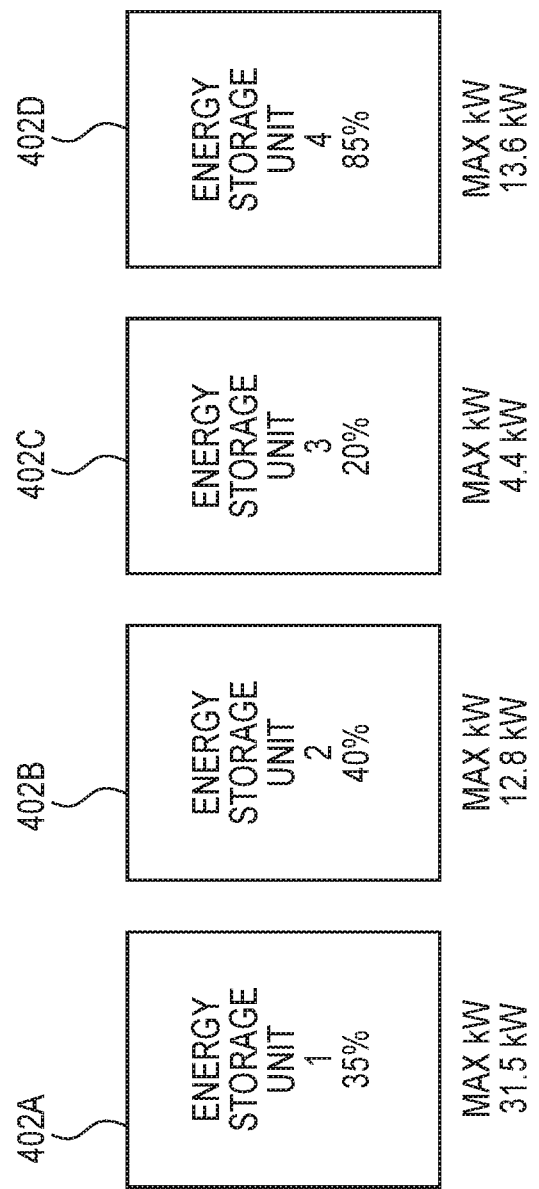
FIG. 6 is a schematic of illustrative energy storage units in accordance with one aspect of the present disclosure.

FIG. 6 is a schematic of illustrative energy storage units 402 in accordance with one aspect of the present disclosure. The units 402 may be described as degraded, i.e., having a reduced maximum capacity. After the capacity has been determined for the units 402, a maximum power that may be provided by a unit 402A, 402B, 402C or 402D is determined. In the example given, the energy storage unit 402A may have started with 90 kW of power, however, over time the capacity level has been reduced to 35%. The total power that the unit 402A may provide may thus be 31.5 kW.

Continuing, an originally energy storage unit 402B capable of storing 32 kW of power has now been degraded to 40% of the original power. The energy storage unit 402B may now only provide a maximum of 12.8 kW. For energy storage unit 402C, the unit may have an original power of 22 kW when fully charged. Now, however, the unit 402C may have been degraded to 20% of its original capacity. The unit 402C may now only provide a maximum of 4.4 kW. For the energy storage unit 402D, the original power may have only been 16 kW. The unit 402D may however have 85% of its original capacity. The unit 402D may then provide a maximum of 13.6 kW of power.

Previously, the maximum amount of power for the degraded units 402 was shown. The total power, however, may not be realized as the power stored within the units 402 may directly depend on how much actual power they have. For example, if each of the units 402 are completely empty and only an hour is given to charge the units, then a maximum amount of power may not be given. The total amount of power that may be given may depend on the amount of pre-existing power in the units 402 as well and how much time the units 402 take to charge. Thus, the total power in the example given above of 62.3 kW may not be fully given in many, but not all, instances.

Figure 7:
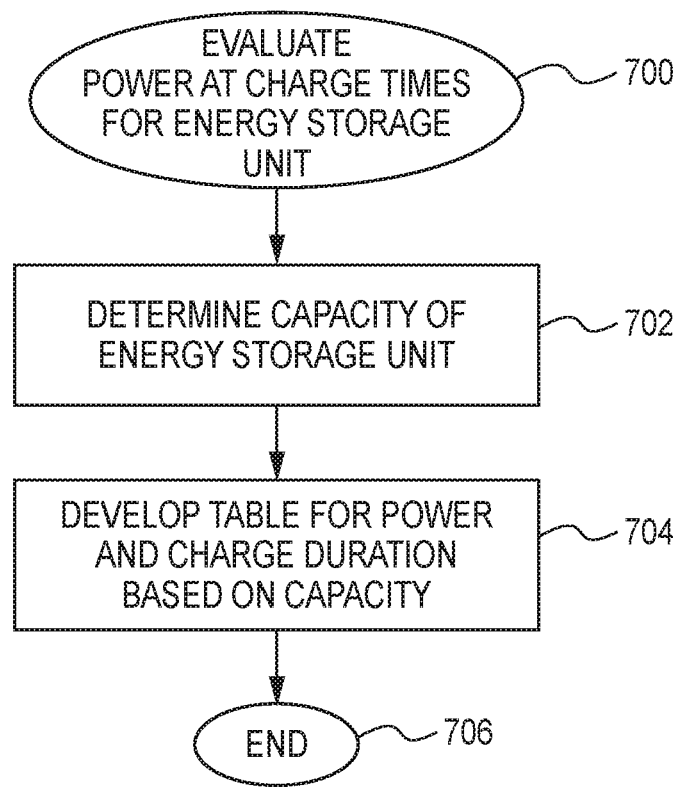
FIG. 7 is a schematic of an illustrative process flow diagram for evaluating charge times for energy storage units in accordance with one aspect of the present disclosure.

FIG. 7 is a schematic of an illustrative process flow diagram for evaluating charge times for energy storage units 402 in accordance with one aspect of the present disclosure. Fewer or more processes may be provided or removed and those shown are for illustrative purposes. The processes may begin at block 700. At block 702, the capacity of each of the energy storage units 402 may be determined. One method was shown above, but should not be construed as the only method for determining the capacity of the units 402.

At block 704, a table is developed to show the power and charge duration of each of the units 402 based on their capacity. The table may be developed by monitoring the power in each of the units 402 at predetermined time periods. Other methods for developing data may include extrapolating data based on typical energy storage unit curves. Curves may be fit and similar data may be interpreted or pulled from the curves. The processes may end at block 706.

Figure 8:
FIG. 8 is a schematic of an illustrative table showing charge times with corresponding percentage and power fills in accordance with one aspect of the present disclosure.

FIG. 8 is a schematic of an illustrative table 800 showing charge times with corresponding percentage and power fills in accordance with one aspect of the present disclosure. The table shows 800 a percentage of capacity that the units 402A, 402B, 402C and 402D may have after a period of time. The period of time is shown in increments of half an hour. Other increments may be used when generating this table 800. Measurements may be taken directly from the unit 402A, 402B, 402C or 402D or may be determined through interpolation. The maximum capacity level was determined earlier such that the energy storage unit 402A may not go past a 35% capacity, the energy storage unit 402B may not go past a 40% capacity, the energy storage unit 402C may not go past a 20% capacity and the energy storage unit 402D may not go past an 85% capacity.

The table 800 shows the percentage of capacity calculated over a period of time if charged. Furthermore, the power that may be provided by the unit 402A, 402B, 402C or 402D at the period charge duration may be given by the table 800. The power within the units 402 may vary depending whether there was power previously stored in the unit 402A, 402B, 402C or 402D. As the unit 402A, 402B, 402C or 402D degrades over time, the capacity of the unit 402A, 402B, 402C or 402D may be checked again. Using the table 800, as will be shown below, the station 118 may make predictions on how much power is stored in the units 402A, 402B, 402C and 402D and how much power should be drawn from other sources, including the power grid 202, to charge the vehicle 102.

Figure 9:
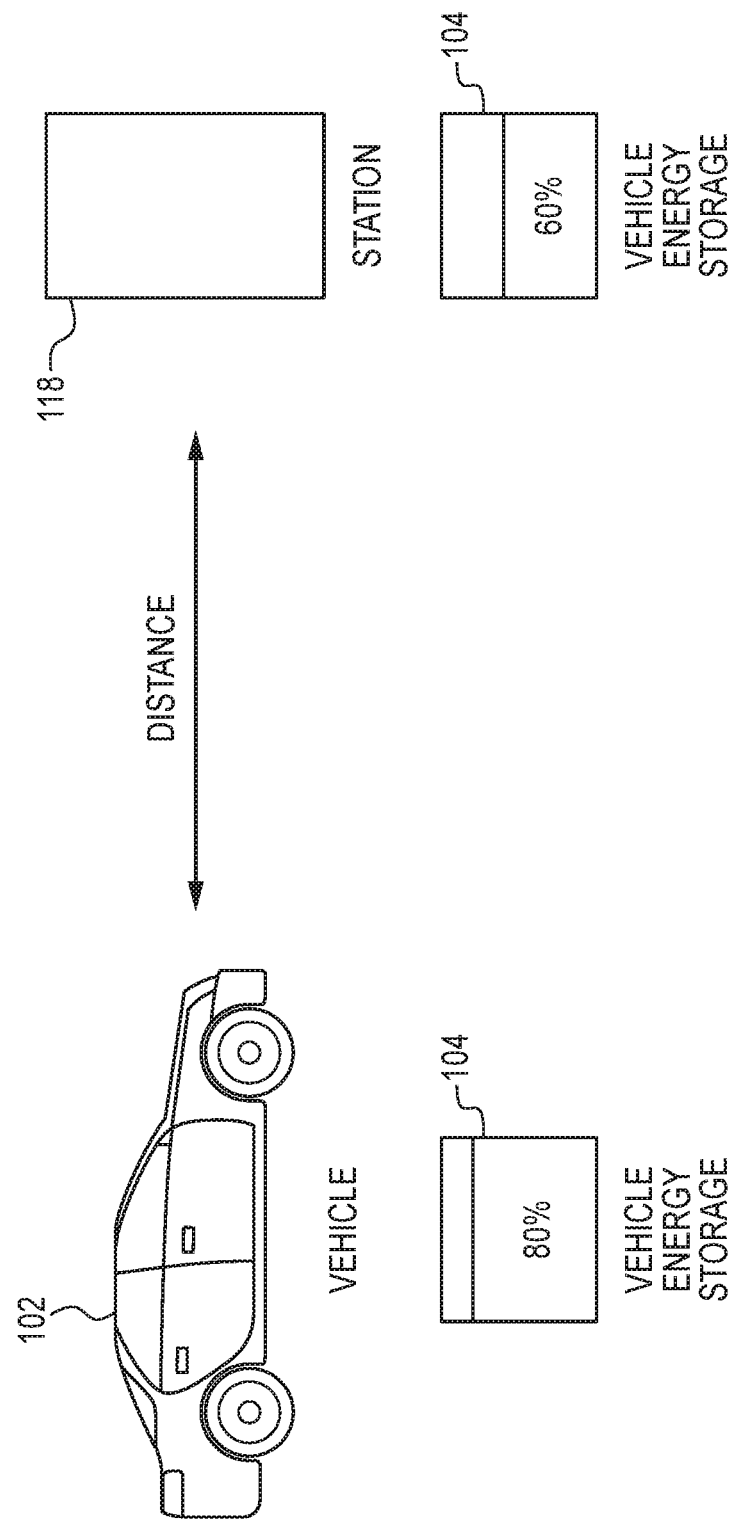
FIG. 9 is a schematic diagram illustrating a vehicle energy storage losing power upon its approach to a charging station in accordance with one aspect of the present disclosure.

Before determining how much power to provide to the units 402A, 402B, 402C and 402D, a determination should be made on how much power the vehicle energy storage unit 104 may have when it arrives at the station 118. FIG. 9 is a schematic diagram illustrating a vehicle energy storage unit 104 losing power upon its approach to a charging station 118 in accordance with one aspect of the present disclosure. Determining the loss of power may occur on the vehicle 102 or the station 118. In one embodiment, calculations may be performed on a remote system that may communicate with both the vehicle 102 and station 118. In one embodiment, a distance, time and/or planned route may be provided from the vehicle 102 to the station 118. Information about the power within the vehicle energy storage unit 104 may be provided to the station 118 as well. The more time given by the vehicle 102 for the station 118 to charge, the more likely the station 118 may be able to provide power to the vehicle 102 through the energy storage units 402.

As illustrated, the vehicle 102 may communicate its distance away from the station 118 and provide that it has an 80% power level. The station 118 may then predict or calculate that the amount of power that may be left in the vehicle energy storage unit 104. The prediction may take into account many factors. Example factors may include a driver's behavior, planned or predicted routes, weather, terrain, intended stops along the route, etc. For example, the driver may have a tendency to press on the brake and accelerator more than another driver. The predicted power within the vehicle energy storage unit 104 then may be lowered. As shown, the predicted charge in the vehicle 102 may be at a 60% power level.

Figure 10:
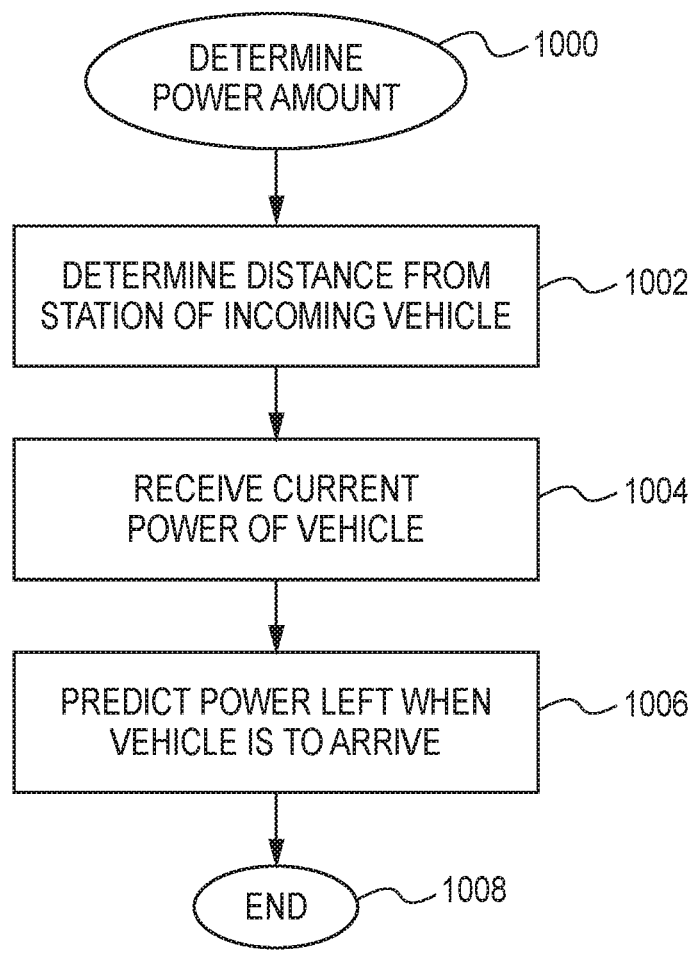
FIG. 10 is a schematic of an illustrative process flow diagram for determining a power amount for the vehicle in accordance with one aspect of the present disclosure.

FIG. 10 is a schematic of an illustrative process flow diagram for determining a power amount for the vehicle 102 in accordance with one aspect of the present disclosure. The purpose for predicting the amount of power for the incoming vehicle 102 is to pre-fill or pre-charge the energy storage units 402A, 402B, 402C and 402D so that they may be used later to provide power to the vehicle 102. Depending on the arrival time of the vehicle 102, the units 402A, 402B, 402C and 402D may be given power and any additional power needed may be drawn from other sources such as the power grid 202. The processes may begin at block 1000. Fewer or more processes may be used.

At block 1002, the distance from the station 118 of the incoming vehicle 102 is determined. A global positioning system on the vehicle 102 may be used to determine its location. Other systems and methods were described above. Using this information along with a known location of the station 118, the distance may be calculated and route predicted or provided. At block 1004, the station 118 may receive the current power or power level of the vehicle energy storage unit 104. At block 1006, a prediction may be made as to the amount of power left in the vehicle energy storage unit 104. The predictions may be made based on the aforementioned factors. The processes may end at block 1008.

While the calculations were performed on the station 118, other implementations are within the scope of this disclosure. For example, the calculations may take place on the vehicle 102 and the predicted amount of power may be provided to the station 118. A remote server may be in communication with the vehicle 102 and the station 118 to make the calculations.

FIGS. 11 through 15 show scenarios for different energy storage unit 402A, 402B, 402C and 402D filling amounts. Typically, the units 402 are not charged to a maximum capacity as the station 118 may not be used continuously. Over time the energy within the units 402 of the station 118 may lose power.

Figure 11:
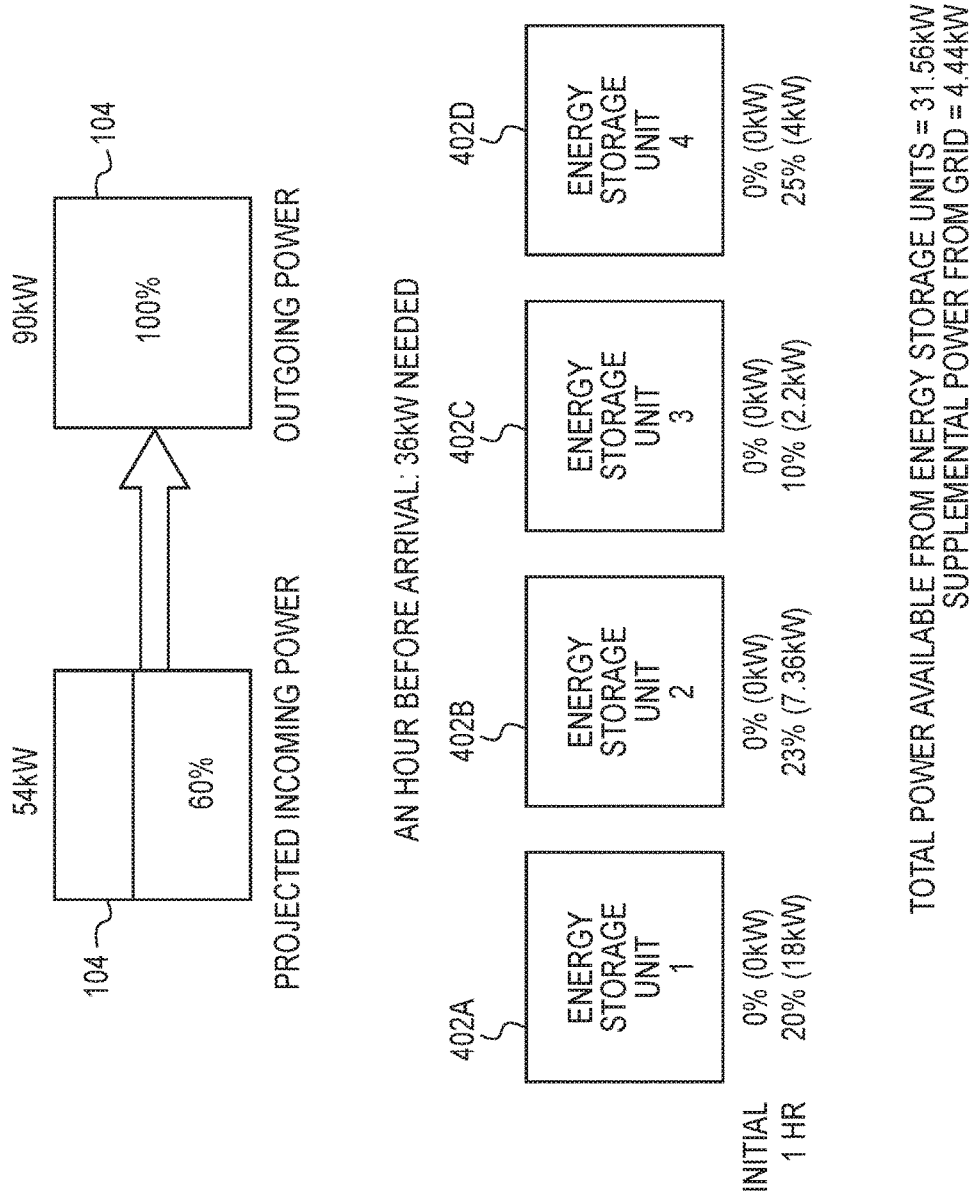
FIG. 11 is a schematic diagram that shows providing power to energy storage units for a fast charge in accordance with one aspect of the present disclosure.

Turning now to FIG. 11 first and also referring back to FIG. 8, a schematic diagram showing charging energy storage units 402A, 402B, 402C and 402D for a fast charge in accordance with one aspect of the present disclosure is provided. The vehicle energy storage unit 104 on the vehicle 102 provides 90 kW when fully charged. The projected incoming charge for the vehicle 102, however, is at 60%. This may be calculated using those factors described above.

In this scenario, the intention of the driver is to increase the power or power level up to 100% when the vehicle 102 leaves the station. The arrival time before the vehicle 102 arrives at the station 118 is an hour and 36 kW would be needed to completely charge the vehicle 102. The station 118 may take advantage of the degraded energy storage units 402A, 402B, 402C and 402D to charge the vehicle 102. Assuming that each of the units 402A, 402B, 402C and 402D have no power or at 0% capacity, after one hour, the energy storage unit 402A may be powered up to 20% for 18 kW, the energy storage unit 402B may be powered up to 23% for 7.36 kW, the energy storage unit 402C may be powered up to 10% for 2.2 kW and the energy storage unit 402D may be powered up to 25% for 4 kW before the incoming vehicle 102 arrives at the station 118. The units 402A, 402B, 402C and 402D may be powered through directing power from the grid 202 to the units 402A, 402B, 402C and 402D and/or taking power from the renewable energy sources 226.

The scenario presented above indicates an even distribution of powering among the units 402. The total amount of power available that may be provided from the units 402 may include 31.56 kW if the units are given an hour to charge. This amount of power reflects their degraded state that was calculated earlier. By pre-filling or pre-charging the units 402, less demand on the grid 202 may be required as the units 402 may provide a portion of the power requested by the incoming vehicle 102. Since the incoming vehicle 102 has requested 36 kW and only 31.56 kW may be provided by the energy storage units 402, 4.44 kW may be supplemented by the grid 202. Through this, the amount of drain on the grid 202 is reduced. In one embodiment, by determining beforehand how much power may be used by the grid 202, the amount of power may be communicated with a power utility to forecast demand. Further, a second use of the energy storage units 402 is provided. In some instances, fast charging may occur as both sources of power (units 402 and grid 202) may be simultaneously used to charge the vehicle 102. Other variations may exist and have been disclosed in the aforementioned description.

The energy storage units 402 may be powered through balancing. Balancing may initially charge one of the units 402A, 402B, 402C or 402D and then proceed to the next unit 402A, 402B, 402C and 402D after a predetermined power is supplied. For illustrative purposes, unit 402A may be powered at 90% of its current degraded state, then unit 402B at 90% of its current degraded state, then unit 402C at 90% of its current degraded state and then finally unit 402D at 90% of its current degraded state. The units 402 may be then be completely powered after this initial period of charging. By balancing, the initial "shock" of powering the units 402, the units 402 may be completed filled to 100% of their degraded state. This balancing may reduce further degradation to the units 402.

Figure 12:
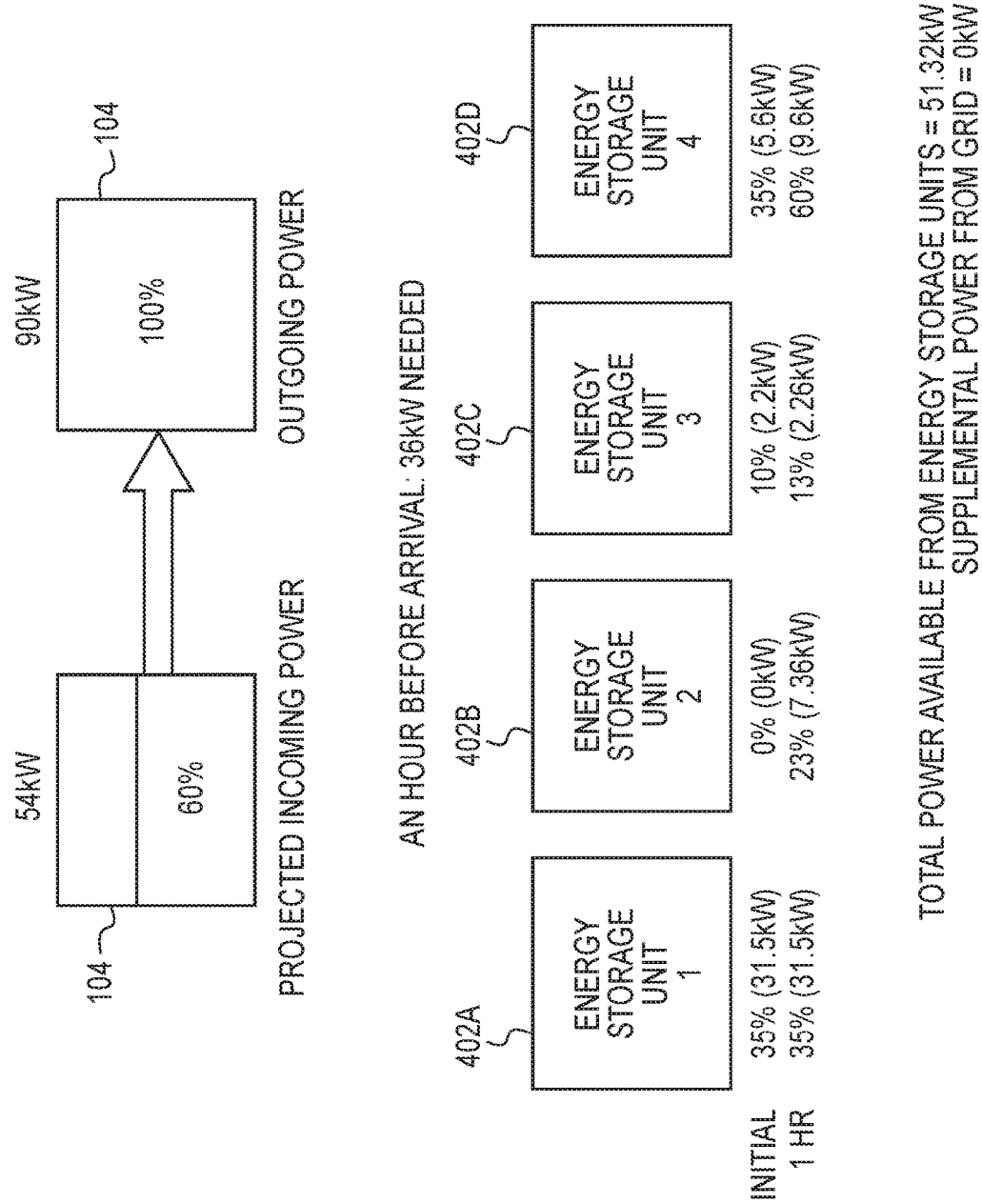
FIG. 12 is another schematic diagram that shows providing power to energy storage units for a fast charge station in accordance with one aspect of the present disclosure.

FIG. 12 is another schematic diagram showing charging energy storage units 402 for a fast charge station in accordance with one aspect of the present disclosure. Similar to before, the vehicle 102 has a 90 kW energy storage unit 104 having a 60% power level when the vehicle is incoming to the station 118. Again, the driver prefers to have their vehicle 102 completely charged at 100% power level. In this scenario however, as opposed to the scenario presented above, each of the units 402 have been pre-charged with power before the incoming vehicle 102 signals to the station 118 that it intends to charge.

To fill the vehicle 102 before it leaves the station 118, the units 402 may be powered for an hour. The energy storage unit 402A has already reached its capacity at 35% thus it may provide 31.5 kW. The energy storage unit 402B has started at 0% and may be charged up to 23% within an hour. The energy storage unit 402B may thus provide 7.36 kW. The energy storage unit 402C may start at 10% and end at 13% to provide 2.86 kW. The energy storage unit 402D may start at 35% and end at 60% to provide 9.6 kW. The uneven distribution of energy provided to the units 402 may depend on a number of factors including whether the unit 402A, 402B, 402C or 402D has been charged and/or de-charged lately. One other factor may include personal preferences by the station operator. For example, the station operator may want to charge and discharge higher powered units 402 rather than lower powered units 402.

In one embodiment, priority relationships may be established. For example, and depending on the power that may be requested by the incoming vehicle 102, the amount of power may be supplied by less than the needed units 402. Those units 402 that may properly satisfy the total power request may then be used. As another example of the prioritizing of charging the units 402, the units 402 with the oldest manufacturing dates may be used first such that the capacity may be degraded and replaced quicker. In one embodiment, the unit 402A, 402B, 402C or 402D with no power may be powered first and those with power are charged subsequently. This may provide additional power in instances where not all units 402 may be charged simultaneously. The purpose of this scenario is to show the uneven distribution of powering the units 402.

As the total power from the units 402 is 51.32 kW and the incoming vehicle 102 is requesting 36 kW, the units 402 may supply the total power. Nevertheless, in some instances, the power may come from the units 402 and the power grid 202. This decision may be dependent on whether another incoming vehicle 102 has indicated that they wish to charge using the station 118. Pricing for using the power from the grid 202 may also be a factor for determining whether to use power from the grid 202 instead of the units 402. For example, if it would be cheaper to use the power grid 202 instead of the power from the units 402, then the grid 202 should be used.

In other instances, the power may be provided by the grid 202. In one embodiment, two of the units 402A, 402B, 402C and/or 402D may be selected while leaving the other units 402A, 402B, 402C and/or 402D free to provide power to other vehicles.

Figure 13:
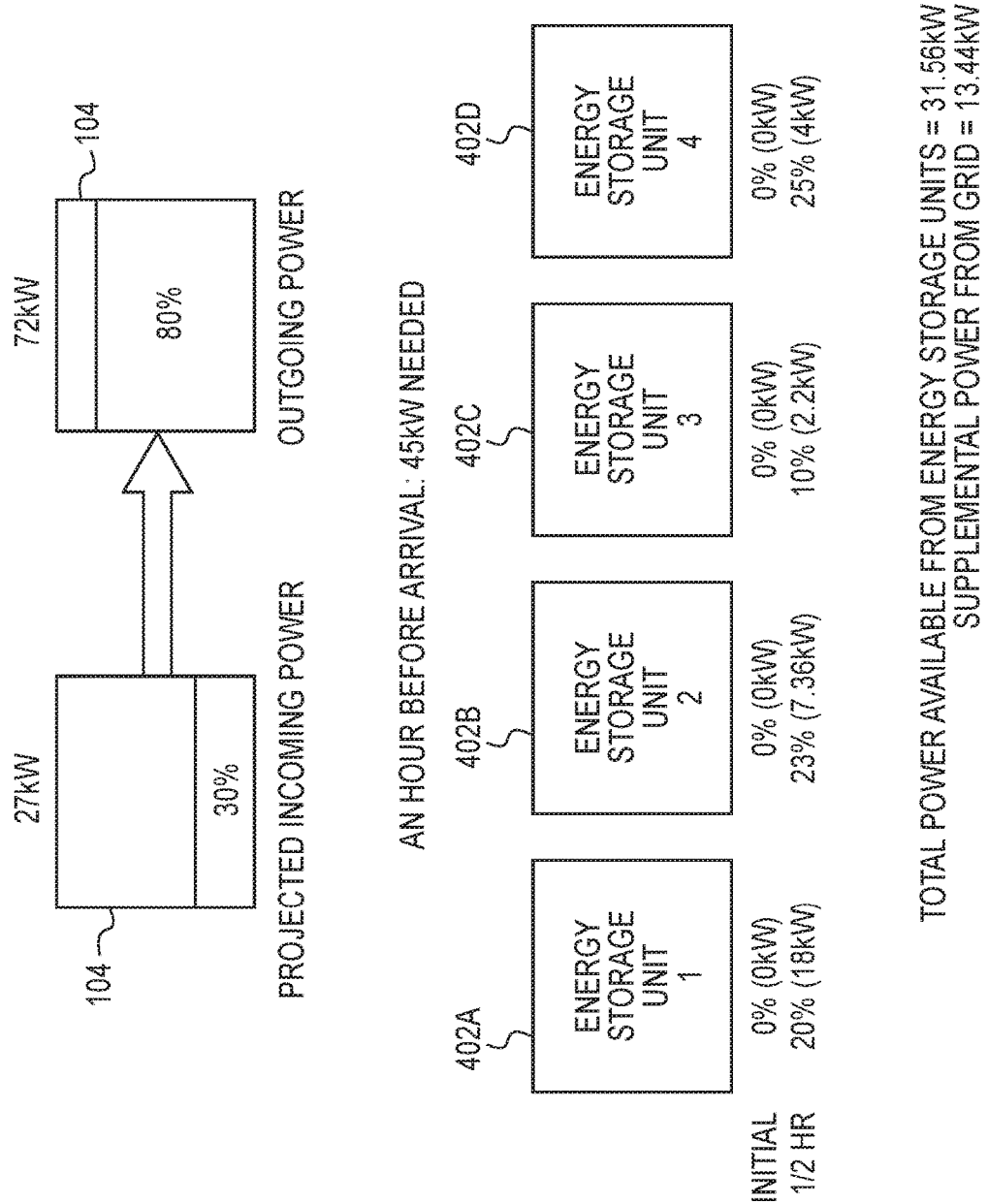
FIG. 13 is another schematic diagram that shows providing power to energy storage units for a fast charge having a reduced amount of time before the vehicle arrives at the station in accordance with one aspect of the present disclosure.

FIG. 13 is another schematic diagram showing charging energy storage units 402 for a fast charge having a reduced amount of time before the vehicle 108 arrives at the station 118 in accordance with one aspect of the present disclosure. Similar to before, the vehicle energy storage unit 104 may store 90 kW. The vehicle energy storage unit 104 may be projected to come in at 30% of its power level. The driver wishes for the vehicle 102 to go out at 80% power so that they may travel to their destination. Accordingly, the vehicle 102 may require 45 kW.

In the scenario, however, the vehicle 102 is coming in within half an hour as opposed to an hour away. This reduced amount of time may result in the use of more power from the grid 202. As shown, the units 402 may begin with 0% power. In half an hour, the energy storage unit 402A may go up to 20% power and provide 18 kW, the energy storage unit 402B may go up to 23% power and provide 7.36 kW, the energy storage unit 402C may go up to 10% power and provide 2.2 kW, and the energy storage unit 402D may go up to 25% power and provide 4 kW. The total energy from the units 402 may be 31.56 kW. Because the vehicle energy storage unit 104 may need 45 kW and only 31.56 kW may be supplied by the units 402, another 13.44 kW may be provided by the grid 202. The scenario illustrates a shorter time frame and calculations that may be needed to determine the supplemental power from the power grid 202. By predicting the use of supplemental power from the power grid 202, an agreement may be made between the station 118 and the power grid 202 to obtain a lower energy cost.

Figure 14:
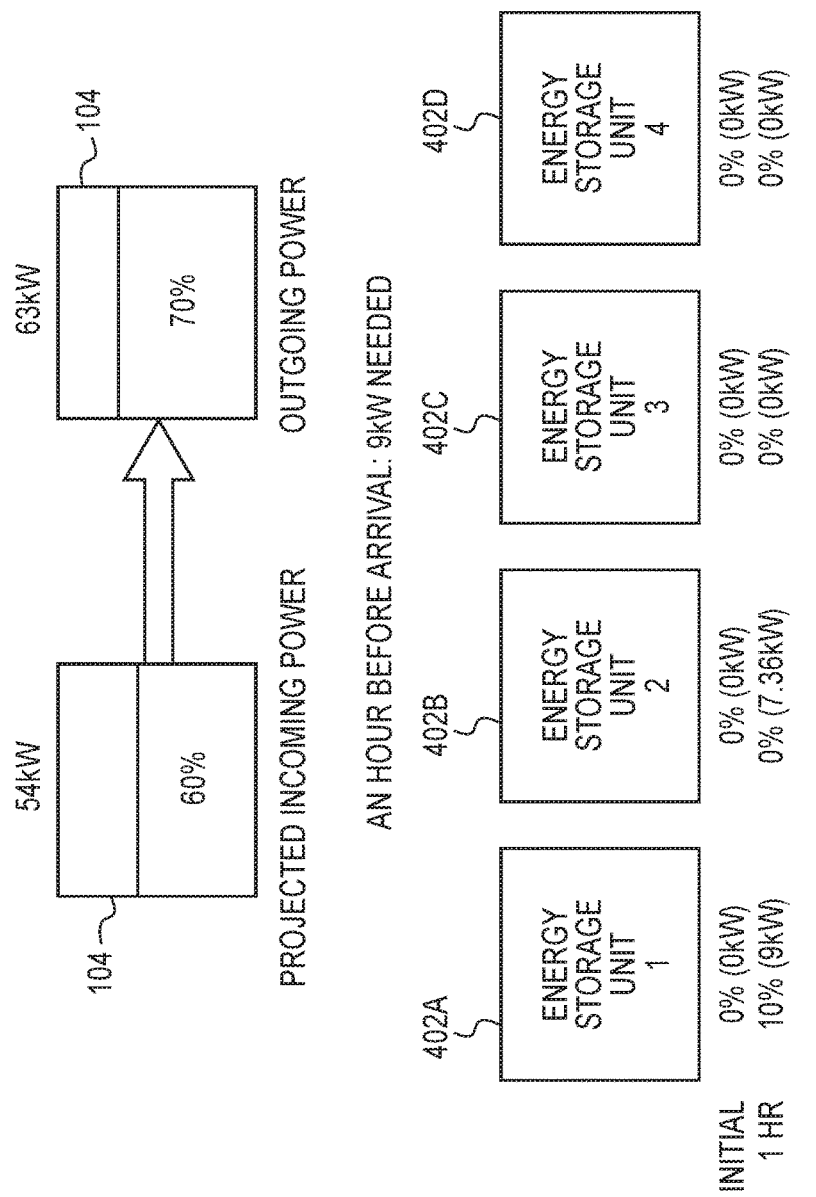
FIG. 14 is another schematic diagram that shows providing power to selected energy storage units for a fast charge in accordance with one aspect of the present disclosure.

FIG. 14 is another schematic diagram that shows providing power to selected energy storage units 402 for a fast charge in accordance with one aspect of the present disclosure. Similar to before, the vehicle energy storage unit 104 may have a projected incoming power or power level of 60%. The driver wishes their outgoing power to be 70%. Thus, a 9 kW may be needed from the units 402.

Because the energy amount is small, only one energy storage unit 402A may be powered during the hour before the vehicle 102 arrives at the station 118. In this instant, the unit 402A may be the only unit used to power the vehicle 102. The energy storage unit 402 would actually only need a half an hour. It was shown that the amount of power supplied may be provided by a single unit 402A with no supplemental power coming from the grid 202.

Figure 15:
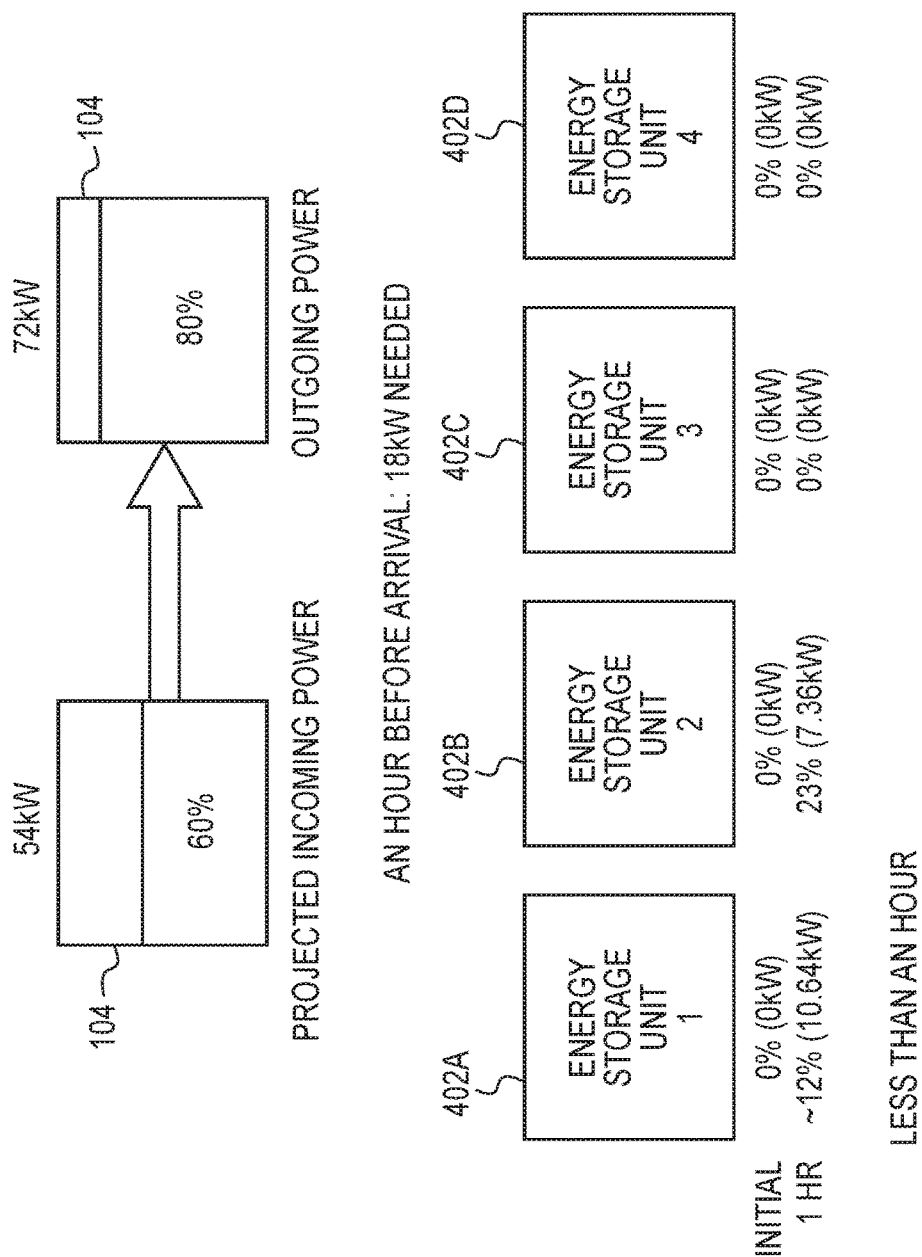
FIG. 15 is another schematic diagram that shows providing power to selected energy storage units for a fast charge in accordance with one aspect of the present disclosure.

FIG. 15 is another schematic diagram showing charging selected energy storage units 402 for a fast charge in accordance with one aspect of the present disclosure. The projected incoming power is at 60% and the driver's intention is to have 80% power when they leave. Thus, 18 kW may be needed by the vehicle energy storage unit 104. The vehicle 102 is to arrive in an hour to the station 118 giving an hour for the units 402 to charge. The purpose of this scenario is to show that the units 402 may be provided power unevenly. Initially, the units 402 may have 0% power and in an hour the energy storage unit 402A may charge to 12% power and provide 10.64 kW, the energy storage unit 402B may charge to 23% power and provide 7.36 kW. The rest of the units 402C and 402D may not be charged since no power is needed from the others and they do not need to be charged.

Figure 16:
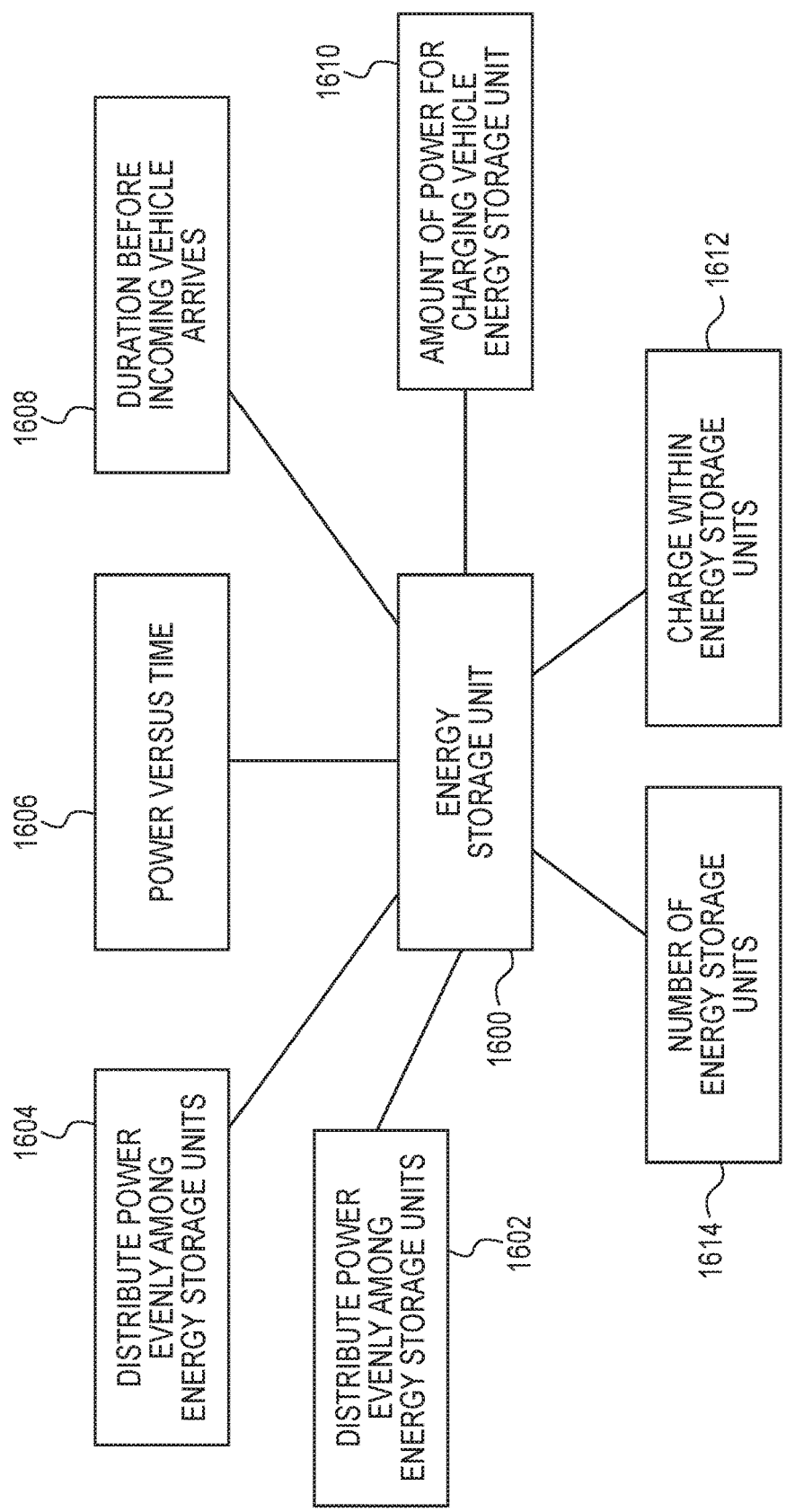
FIG. 16 is a schematic diagram providing exemplary parameters useful for providing power to the energy storage units in accordance with one aspect of the present disclosure.

FIG. 16 is a schematic diagram providing exemplary parameters 1600 useful for charging the energy storage units 402 in accordance with one aspect of the present disclosure. The parameters, as shown centrally at block 1600, were previously discussed but are reiterated for purposes of clarification. One parameter is whether the user wishes to distribute the power among all the energy storage units 402 equally at block 1602. Uniformity among the units 402 may take advantage of all the units 402 and degrade the units 402 equally. For example, each of the units 402 may be charged equally for a period of time, i.e., unit 402A may be charged and hour, unit 402B may be charged and hour, unit 402C may be charged and hour and unit 402D may be charged and hour.

At block 1604, the power may be distributed unevenly among the energy storage units. By having an uneven distribution, wear may be directed to certain units 402A, 402B, 402C or 402D. For example, if a user wishes to dispose of lower power units 402A, 402B, 402C or 402D first, then the user may direct the charging and discharging of those units 402A, 402B, 402C or 402D.

At block 1606, power versus time may be a parameter for charging the units 402. This may be directly calculated or interpolated from data of the units 402. At block 1608, the duration before an incoming vehicle 102 arrives may be one parameter that the station 118 uses to determine fills for the units 402A, 402B, 402C and 402D. This information may be used to determine how much power may be required from the power grid 202.

At block 1610, the amount of power for charging the vehicle energy storage unit 104 may be determined. This may include information about how much power the vehicle 102 currently has. At block 1612, the power within the energy storage units 402 on the station 118 may also be a parameter for determining how much power to provide the energy storage units 402. In some instances, the units 402 may have power already stored therein.

At block 1614, the number of energy storage units may be a parameter. While four units 402 were shown above, the energy storage bank 230 may include one. Five or more units 402 may also be included within the bank 230.

Figure 17:
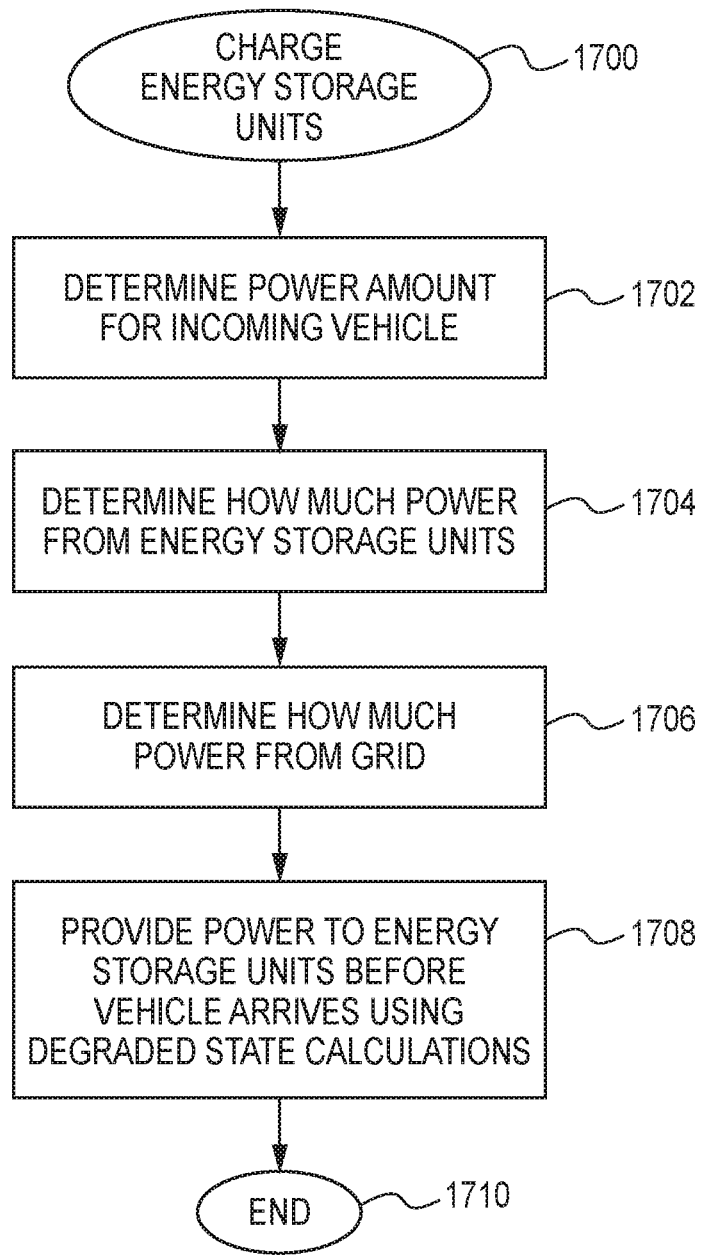
FIG. 17 is a schematic of an illustrative process flow diagram for providing power to the energy storage units in accordance with one aspect of the present disclosure.

FIG. 17 is a schematic of an illustrative process flow diagram for providing power to the energy storage units 402 in accordance with one aspect of the present disclosure. Fewer or more processes may be used to provide power to the energy storage units 402. The processes may begin at block 1700. At block 1702, a power request may be determined from an incoming vehicle 102. Described above, this was the predicted amount of power the vehicle 102 may have when the vehicle 102 arrives at the station 118 and how much power the user wishes to leave with. Based on this information, the total amount of power requested may be determined.

At block 1704, a determination may be made for the amount of power that may be supplied by the energy storage units 402. This may be a factor of how long they have to charge before the vehicle 102 arrives. At block 1706, a determination is made on how much power from the grid 202 may be required to supplement the total power requested from the vehicle 102. The energy storage units 402 are powered before the vehicle 102 arrives using the degraded state calculations at block 1708. These calculations may be determined from the table that was generated beforehand. The processes may end at block 1710.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method for a charging station to provide power to a vehicle energy storage unit on an incoming vehicle, the method comprising:
   predicting power of the vehicle energy storage unit when the incoming vehicle arrives at the charging station;
   determining power to be supplied by at least one energy storage unit on the charging station having a degraded state and power to be supplied by a power grid connected to the charging station based on the predicted power of the vehicle energy storage unit of the incoming vehicle;
   based on the power to be supplied by the at least one energy storage unit having the degraded state, pre-filling the at least one energy unit before the vehicle arrives at the charging station based on a predetermined table, wherein the predetermined table comprises information about the at least one energy storage unit and corresponding fill time; and
   providing the power to the vehicle energy storage unit from the at least one energy storage unit on the charging station, the power grid and a combination thereof.

2. The computer-implemented method of claim 1, wherein determining the power to be supplied by the at least one energy storage unit on the charging station having the degraded state comprises detecting a maximum capacity of the at least one energy storage unit.

3. The computer-implemented method of claim 2, wherein detecting the maximum capacity of the at least one energy storage unit comprises fully powering the at least one energy storage unit and detecting an amount of time for the power of the at least one energy storage unit to reach zero.

4. The computer-implemented method of claim 1, wherein providing the power to the vehicle energy storage unit from the at least one energy storage unit, power grid and combination thereof comprises providing the power from the at least one energy storage unit first.

5. The computer-implemented method of claim 1, wherein providing the power to the vehicle energy storage unit from the at least one energy storage unit, power grid and combination thereof comprises providing the power simultaneously from the at least one energy storage unit and the power grid.

6. The computer-implemented method of claim 1, wherein determining the power to be supplied by the at least one energy storage unit on the charging station comprises detecting two or more energy storage units.

7. The computer-implemented method of claim 6, comprising providing power to the two or more energy storage units based on a station operator preference.

8. The computer-implemented method of claim 6, comprising providing power to the two or more energy storage units based on whether the two or more units have been charged and discharged lately.

9. The computer-implemented method of claim 6, comprising providing power to the two or more energy storage units based on whether the two or more energy units satisfy a total power request.

10. The computer-implemented method of claim 6, comprising providing power to the two or more energy storage units based on an oldest manufacturing date of the two or more energy storage units.

11. A charging station comprising:
    at least one energy storage unit having a degraded maximum capacity; and
    a controller predicting power of a vehicle energy storage unit on an incoming vehicle,
    determining power to be supplied by the at least one energy storage unit having the degraded capacity and power to be supplied by a power grid based on the predicted power of the vehicle storage unit of the incoming vehicle, and based on the based on the power to be supplied by the at least one energy storage unit having the degraded state, pre-filling the at least one energy unit before the vehicle arrives at the charging station based on a predetermined table, wherein the predetermined table comprises information about the at least one energy storage unit and corresponding fill time.

12. The charging station of claim 11, wherein the predetermined table is developed through a capacity of the at least one energy storage unit.

13. The charging station of claim 11, wherein the power to be supplied by the at least one energy storage unit having the degraded capacity comprises completely prefilling the at least one energy storage unit and determining the power to be supplied by the power grid.

14. The charging station of claim 13, wherein the power to be supplied by the power grid is communicated with a power utility to forecast demand.

15. The charging station of claim 11, wherein the at least one energy storage unit is a depleted second use battery from an electric or hybrid vehicle.

16. The charging station of claim 15, wherein the second use battery has a capacity below 75%.

17. A charging station computing system comprising:
    at least one processor; and a memory operatively coupled to the processor, the memory storing program instructions that when executed by the processor, causes the processor to:
    predict power of a vehicle energy storage unit of an incoming vehicle;
    pre-fill power to at least one energy storage unit having a degraded state based on a predetermined table using the predicted power of the vehicle energy storage unit of the incoming vehicle wherein the predetermined table comprises information about the at least one energy storage unit and corresponding fill time; provide power to the incoming vehicle when connected to the charging station with the at least one energy storage unit and supplemented by a power grid.

18. The charging station computing system of claim 17, wherein pre-filling the power to the at least one energy storage unit comprises providing power uniformly to multiple energy storage units having a degraded state.

* * * * *